(12) United States Patent
Renforth

(10) Patent No.: US 10,856,530 B2
(45) Date of Patent: Dec. 8, 2020

(54) LEASH APPARATUS HAVING HOUSING WITH PHOTOLUMINESCENT COATING

(71) Applicant: Doskocil Manufacturing Company, Inc., Arlington, TX (US)

(72) Inventor: Jack Renforth, Azle, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 398 days.

(21) Appl. No.: 15/058,764

(22) Filed: Mar. 2, 2016

(65) Prior Publication Data

US 2016/0255816 A1 Sep. 8, 2016

Related U.S. Application Data

(60) Provisional application No. 62/127,385, filed on Mar. 3, 2015, provisional application No. 62/267,319, filed on Dec. 15, 2015.

(51) Int. Cl.
| | |
|---|---|
| *A01K 27/00* | (2006.01) |
| *B29C 70/78* | (2006.01) |
| *B29C 70/84* | (2006.01) |
| *B29C 70/70* | (2006.01) |
| *B29K 21/00* | (2006.01) |

(52) U.S. Cl.
CPC .......... *A01K 27/006* (2013.01); *A01K 27/004* (2013.01); *B29C 70/70* (2013.01); *B29C 70/78* (2013.01); *B29C 70/84* (2013.01); *B29K 2021/003* (2013.01); *B29K 2995/0018* (2013.01)

(58) Field of Classification Search
CPC .... A01K 27/00; A01K 27/004; A01K 27/006; B29K 2995/0018

USPC .......................................... 119/792, 794, 796
See application file for complete search history.

(56) References Cited

U.S. PATENT DOCUMENTS

| | | | | |
|---|---|---|---|---|
| 2,798,458 | A | * | 7/1957 | Odermatt ............. A01K 27/001 119/858 |
| 3,150,843 | A | * | 9/1964 | Cordoba ................ A01K 89/00 242/380 |
| 5,887,550 | A | * | 3/1999 | Levine ................. A01K 27/004 119/796 |
| 6,207,077 | B1 | * | 3/2001 | Burnell-Jones .......... C08J 5/043 252/301.36 |
| D453,386 | S | * | 2/2002 | Philipson ....................... D26/38 |
| 6,619,239 | B1 | * | 9/2003 | Benson ................ A01K 27/004 119/795 |
| 6,656,566 | B1 | * | 12/2003 | Kuykendall ........... G02B 5/124 428/138 |

(Continued)

*Primary Examiner* — Christopher D Hutchens
(74) *Attorney, Agent, or Firm* — Global IP Counselors, LLP

(57) ABSTRACT

A leash includes a housing, a spool assembly, a trigger, and a switch. At least a portion of the housing includes a photoluminescent material. The spool assembly is rotatably mounted inside of the housing and is configured to selectively wind a leash. The trigger is movably mounted on an inner section of the grip portion, the trigger being configured to inhibit rotation of the spool assembly in response to actuation of the trigger, and configured to rotate the spool assembly in response to release of the trigger. The switch is mounted on the housing, the switch being configured to move between a locked position in which the trigger is locked in an actuated position, and an unlocked position in which the trigger is free to operate.

3 Claims, 3 Drawing Sheets

(56) References Cited

U.S. PATENT DOCUMENTS

| | | | | |
|---|---|---|---|---|
| 7,980,203 B1* | 7/2011 | Rubottom | ............ | A01K 27/006 |
| | | | | 119/856 |
| 2004/0237906 A1* | 12/2004 | Waxman | ............. | A01K 27/004 |
| | | | | 119/796 |
| 2005/0229868 A1* | 10/2005 | Young, III | ........... | A01K 27/005 |
| | | | | 119/798 |
| 2006/0162673 A1* | 7/2006 | Hurwitz | ............... | A01K 15/025 |
| | | | | 119/709 |
| 2008/0216769 A1* | 9/2008 | LaCross | ............... | A01K 27/005 |
| | | | | 119/798 |
| 2009/0020077 A1* | 1/2009 | Macrae | .................. | A01K 15/02 |
| | | | | 119/719 |
| 2009/0027873 A1* | 1/2009 | Tarlton | ................. | G02B 6/0003 |
| | | | | 362/84 |
| 2009/0183691 A1* | 7/2009 | Hassan | ................ | A01K 27/006 |
| | | | | 119/796 |
| 2009/0217886 A1* | 9/2009 | Lopusnak | ............ | A01K 27/004 |
| | | | | 119/796 |
| 2009/0283056 A1* | 11/2009 | Mattera | ................ | A01K 27/006 |
| | | | | 119/858 |
| 2013/0260075 A1* | 10/2013 | Dust | ..................... | B29C 39/025 |
| | | | | 428/51 |
| 2014/0216359 A1* | 8/2014 | Wechsler | ............. | A01K 27/003 |
| | | | | 119/795 |
| 2015/0208613 A1* | 7/2015 | Krasilczuk | ........... | A01K 27/003 |
| | | | | 119/792 |
| 2016/0242391 A1* | 8/2016 | Stone | .................... | A01K 15/025 |
| 2016/0317855 A1* | 11/2016 | Rolls | .................. | A63B 21/0603 |

* cited by examiner

LEASH APPARATUS HAVING HOUSING WITH PHOTOLUMINESCENT COATING

CROSS-REFERENCE TO RELATED APPLICATIONS

This application claims priority to U.S. Provisional Application No. 62/127,385, filed Mar. 3, 2015 and U.S. Provisional Application No. 62/267,319, filed Dec. 15, 2015, the contents of which is hereby incorporation herein by reference.

BACKGROUND

Field of Invention

The invention relates generally to retractable leash handle assemblies. More particularly, one embodiment is directed to a leash having glow in the dark features on the leash body and/or handle.

Background of the Invention

Animals such as dogs are regularly walked by their owners for exercise and for other purposes. Such animal walks can occur during daylight hours but also often occur after dark. While it is known to carry a flashlight or other lighting source during nighttime hours for reasons of safety, the pet owner typically must hold the animal's leash in one hand, and the other hand often is carrying a plastic bag that may or may not be filled with animal waste.

Some conventional leashed enable a person having a pet tethered to a leash cord to fluidly adapt to changing spatial relationships between the person and the pet. A housing typically encloses a mechanism for automatically retracting the leash into the housing. Retractable leash assemblies generally operate in two modes. A first mode provides a spring loaded tension on a retractable leash cord. The spring-loaded tension causes the leash cord to retract as slack develops, extend as the owner allows the pet to roam at a further distance, and stops the leash from dragging on the ground. A second locking mode removes the spring-loaded tension and stops the leash from either retracting or extending.

SUMMARY

It has been found that it is desirable to provide an improved animal tethering device (leash) that improves nighttime safety without additionally encumbering the animal's owner with additional devices to carry, etc. A leash includes a housing, a spool assembly, a trigger, and a switch. At least a portion of the housing includes a photoluminescent material. The spool assembly is rotatably mounted inside of the housing and is configured to selectively wind a leash. The trigger is movably mounted on an inner section of the grip portion, the trigger being configured to inhibit rotation of the spool assembly in response to actuation of the trigger, and configured to rotate the spool assembly in response to release of the trigger. The switch is mounted on the housing, the switch being configured to move between a locked position in which the trigger is locked in an actuated position, and an unlocked position in which the trigger is free to operate.

BRIEF DESCRIPTION OF THE DRAWINGS

Referring now to the attached drawings which form a part of this original disclosure.

DETAILED DESCRIPTION OF EMBODIMENTS

Figure 1:
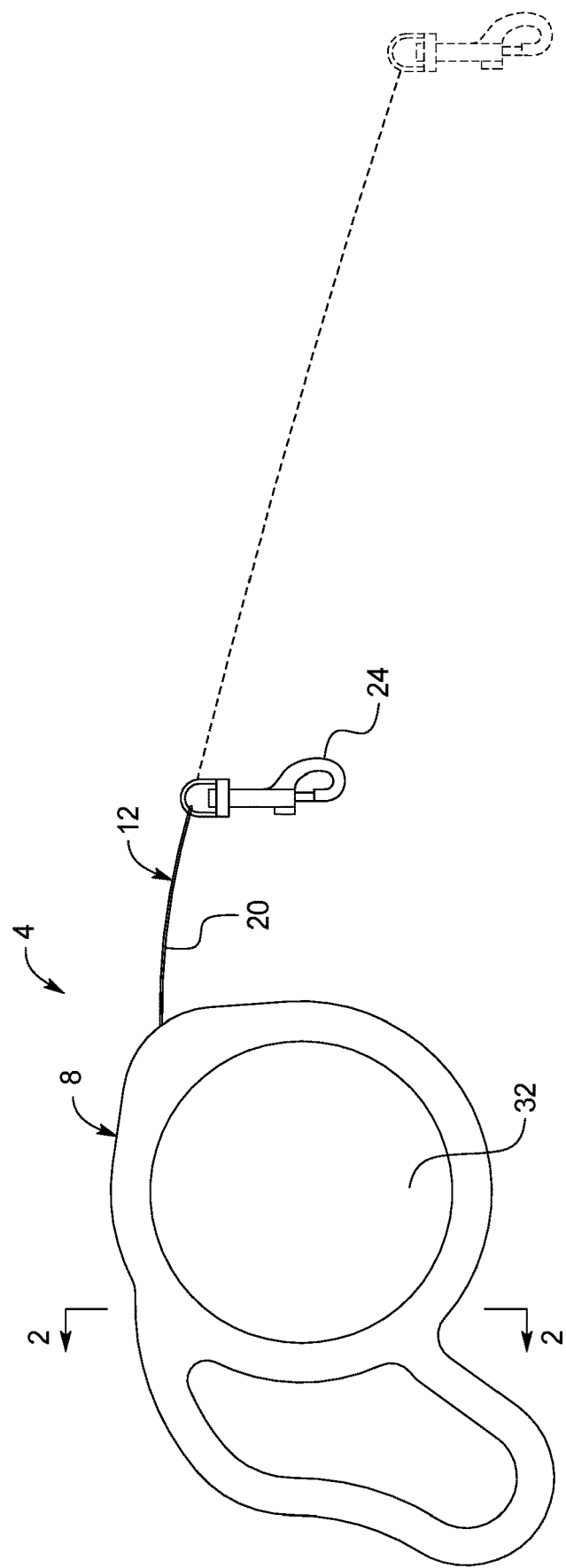
FIG. 1 illustrates an elevational side view of a leash apparatus according to embodiment.
Figure 2:
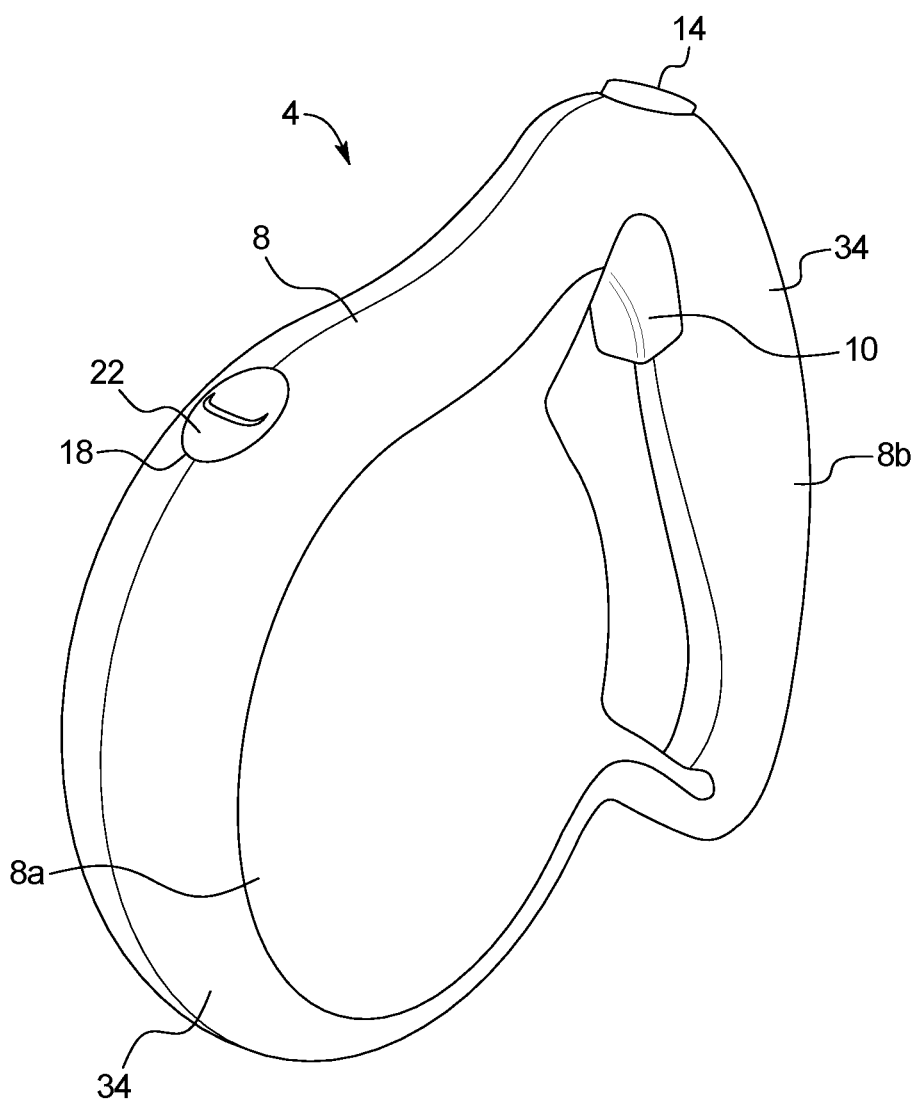
FIG. 2 is a top perspective view of the leash apparatus of FIG. 1.

An improved leash apparatus 4 in accordance with the disclosed and claimed concept is depicted generally in FIGS. 1 and 2. The leash apparatus 4 can include a housing 8 upon which is situated a retractable tether apparatus 12. The housing 8 includes a main body portion 8a and a grip portion 8b and has a hollow interior region 16 that carries therein a retraction mechanism of the tether apparatus 12 that is operable to move the tether apparatus between a retracted position partially retracted into the interior region 16 and a deployed position at least partially extended from the interior region 16. The retraction mechanism is not expressly depicted herein for reasons of simplicity of disclosure, but it is understood to include structures such as actuation buttons, locking devices, spring-operated rotatable spools, and the like that are generally well known. The grip portion 8b may be integrally fabricated with the housing, or in alternative embodiments be fabricated separately from the housing and subsequently fastened to the housing.

In one embodiment, the retraction mechanism can include a spooling assembly rotatably mounted in the housing, a trigger 10 movably mounted to the grip portion 8b, and a dual-position switch 14 for locking the trigger 10 in an actuated position. Actuating the trigger 10 inhibits the spooling mechanism from rotating. Releasing the trigger 10 enables the spooling mechanism to rotate freely to extend or retract the leash. Optionally, the spooling assembly is spring biased to cause the leash to retract in response to the trigger 10 being in a released position and in the absence of an external force of a preset value being exerted on a leash wound on the spool assembly. The dual-position switch 14, located proximate to the grip portion 8b, operates in a first locked position to lock the trigger 10 in an actuated position, and in a second unlocked position that enables the trigger 10 to operate freely. The trigger 10 and the dual-position switch 14 are positioned proximate to each other so that the same hand can grasp the grip, actuate the trigger 10 with one finger, and operate the dual-position switch 14.

The trigger 10 can be movable mounted to a radially inner section of the grip portion 8b, proximate to an upper most portion of the housing. The location of the trigger 10 enables a user to actuate the trigger 10 with an index finger, which using the remaining fingers of the grasping hand to hold onto the grip portion 8b. Actuating the trigger 10 inhibits the leash from extending from or retracting into the housing 8. The dual-position switch 14 can be movably mounted to an upwardly facing surface of the housing 8. The dual-position switch 14 operates in a first position to lock the trigger 10 in an actuated position, and operates in a second position to enable the trigger 10 to operate freely.

The tether apparatus 12 additionally includes a tether 20 that is elongated and flexible and is connected with the retraction mechanism and further includes a clasp 24 that is disposed at an end of the tether 20 at a location distal to the housing 8. The leash apparatus 4 is depicted in FIG. 1 in the retracted position, but FIG. 1 also depicts in dashed lines a schematic representation of the leash apparatus 4 being in the deployed position.

A forward facing portion of the housing 8 has an orifice 18 with a center portion through which the tether 20 passes. The housing 8 also includes an anti-wear ring 22 mounted in the orifice 18. The anti-wear ring 22 buffers the leash through the orifice to reduce the frictional wear on the tether 20 due to the tether 20 rubbing against the portion of the housing 8 defining the orifice 18. The anti-wear ring 22 also inhibits the tether 20 from forcing the housing 8 halves apart during extension and retraction of the tether 20. According to an illustrative embodiment, the anti-wear ring 22 is fabricated as a unitary structure and formed from a lubricious material, such as nylon or delrin.

As discussed above, in operation, actuating the trigger 10 inhibits the tether 20 from extending out of or retracting into the housing 8. Releasing the trigger 10 enables the tether 20 to pass freely through the orifice 18 and the anti-wear ring 22. Placing the dual-position switch 14 in a first locked position while the trigger 10 is actuated locks the trigger 10 in an actuated position. Alternatively, placing the dual-position switch 14 in a second unlocked position enables the trigger 10 to operate freely. If the trigger 10 is in a released position, the dual-position switch 14 is inhibited from being moved into the first locked position. When the trigger 10 is in a released position, the tether 20 is subject to a spring bias that tends to retract the tether 20 into the housing 8. This spring bias reduces slack in an extended portion of the tether 20, which may result from changes in the spatial relationship between a person and an animal tethered to the tether 20.

The grip portion 8b generally forms an arc. The midpoint of the arced grip assembly is substantially co-linear with the center of the orifice 18, which reduces the tendency of the handle 8 to rotate about an axis in response to externally exerted forces, such as those applied to a leash by tugging animals.

As shown in FIG. 2, the housing 8 can include a support 28 and to further include a polymeric coating 32 that is disposed on the support 28. The support 28 in the depicted exemplary embodiment is a hollow polymeric or metallic shell that is relatively rigid and that includes a handle portion that can be grasped by the pet owner when the leash apparatus 4 is being used. The exemplary support 28 is depicted in FIG. 2 as including a first support portion 36 and a second support portion 40 that have the interior region 16 situated generally therebetween. The first and second support portions 36 and 40 can be formed in any of a variety of fashions, such as by or other appropriate methodology.

The polymeric coating 32 is formed from a polymeric material such as PVC to which a photoluminescent component 34 can be added, the polymeric coating 32 being molded and/or cured in situ on an exterior surface 42 of the support 28. More particularly, the polymeric coating 32 in the depicted exemplary embodiment is molded on the exterior surface 42 with the use of a mold 44 within which the support 28 is at least partially received prior to the molding operation.

The mold 44 is depicted herein as including a first mold portion 48 and a second mold portion 52 within which at least a portion of the support 28 is situated and is retained in a given position therein by the mold 44 or by other structures that are cooperable with the mold 44.

In one embodiment, the photoluminescent component 34 (glow in the dark material) can be thermoplastic rubber (TPR), in which portion of the housing is made. For example, portions of the housing 8 including the grip portion 8b can be formed from the polymeric coating 32 with the photoluminescent component 34. Accordingly, in one embodiment, the housing 8 or portions of the housing 8 are molded using a material that includes the photoluminescent component 34. That is, the thermoplastic material (or other suitable material) is formed or infused with glow in the dark material 32 prior to the molding or form process. In another embodiment, the glow in the dark material 32 is added to the housing 8 after the molding process. It is noted that any suitable glow in the dark material 32 can be disposed on the housing, including but not limited to glow in the dark tape, glow in the dark paint and any other suitable glow in the dark material 32. Moreover, the glow in the dark material 32 can be disposed on a suitable portion of the housing 8, and can include the entire housing 8. For example, as shown in FIG. 2, the glow in the dark portions of the housing 8 include the grip portion 8b and the outer peripheral portion of the main body portion 8a of the housing 8.

Figure 3:
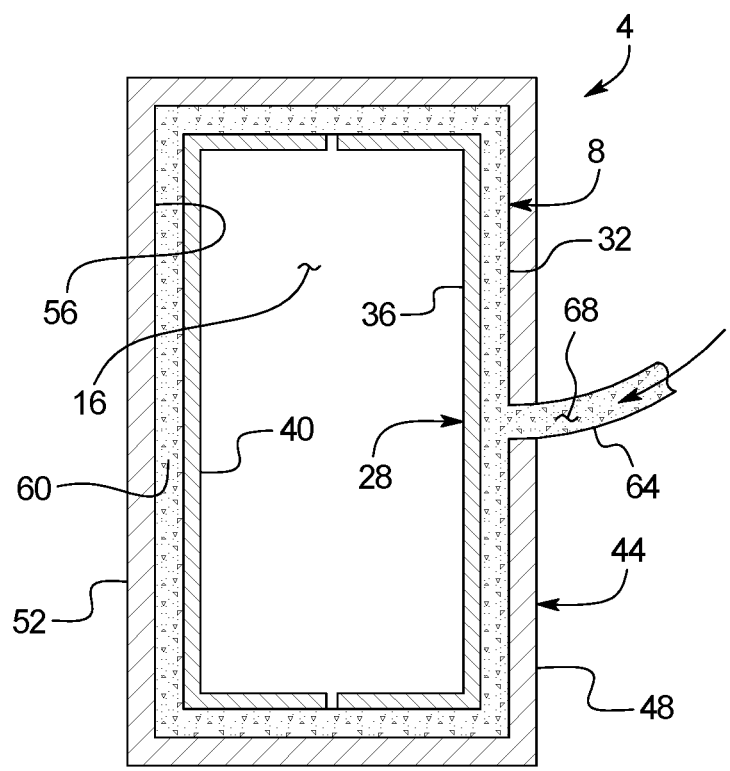
FIG. 3 is a cross-sectional view of the mold that forms the photoluminescent component of the leash apparatus of FIG. 1.

As shown in FIG. 3, when the first and second support portions 36 and 40 are received within a cavity 56 of the mold 44, a gap 60 exists between the support 28 and the surface of the mold 44 that faces the cavity. The mold 44 additionally includes an inlet 64 through which uncured polymeric material 68 having a photoluminescent component 34 is received into the gap 60. That is, the mold 44 and the support 28 are situated adjacent one another with the gap 60 being in therebetween, and the uncured polymeric material 68 is received in the gap 60 and is caused to be cured in situ on the exterior surface 42 of the support 28. In the depicted exemplary embodiment, the first and second support portions 36 and 40 are simultaneously received in the cavity 56 mold 44, and the uncured polymeric material 68 is cured as a single polymeric 32 coating coats the entirety or a substantial portion of the entirety of the exterior surface 42 of the support 28. It is understood, however, that in other embodiments the first and second mold portions 48 and 52 could be individually coated with the uncured polymeric material 68 and may likewise separately have the uncured polymeric material 68 cured in situ on the exterior surface so that when the first and second support portions 36 and 40 are physically connected to one another the leash apparatus 4 is formed with the polymeric coating 32 being in a cured state on the exterior surface 42 of the support 28.

It is understood that numerous other methodologies may be employed to form the photoluminescent component 34 on the exterior of the housing 8. It is also understood that the housing 8 potentially could be molded or otherwise formed in its entirety of a material having a photoluminescent component 34.

In use, the leash apparatus 4 and, more particularly, the photoluminescent component 34, is subjected to electromagnetic radiation such as visible light, which causes photoexcitation of the photoluminescent component 34. Such photoexcitation causes the photoluminescent component 34 to emit visible light via photoluminescence. The tether 20 can then be deployed from the housing 8 and attached to an animal, and the animal can then be walked in a safe fashion during nighttime hours.

The improved leash apparatus 4 avoids the need to provide batteries or other power source for active light sources such as LEDs or incandescent lights, which simplifies use and avoids complication. Such photoluminescence can be activated prior to initiation of the walk and can be refreshed or recharged with the use of street lights, house lights, and the like without limitation. The improved leash apparatus 4 thus advantageously enhances safety by providing visible light at nighttime via photoluminescence, which helps to alert drivers and other to the presence of the animal and its owner.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A leash apparatus comprising:
a housing including a grip portion, the housing being partially formed from a polymeric coating having a photoluminescent component that is molded on an exterior surface of the housing, the housing and the grip portion being formed from a thermoplastic material infused with the photoluminescent component, the photoluminescent component being thermoplastic rubber;
a spool assembly rotatably mounted inside of the housing and configured to selectively wind a leash;
a trigger movably mounted on an inner section of the grip portion, the trigger being configured to inhibit rotation of the spool assembly in response to actuation of the trigger, and configured to rotate the spool assembly in response to release of the trigger; and
a switch mounted on the housing, the switch being configured to move between a locked position in which the trigger is locked in an actuated position, and an unlocked position in which the trigger is free to operate.

2. The leash apparatus according to claim 1, wherein the photoluminescent component is disposed on an exterior portion of the housing.

3. The leash apparatus according to claim 1, wherein the photoluminescent component is disposed on a main body portion of the housing.

\* \* \* \* \*